(12) United States Patent
Ansari

(10) Patent No.: US 7,680,113 B2
(45) Date of Patent: Mar. 16, 2010

(54) INTER-FE MPLS LSP MESH NETWORK FOR SWITCHING AND RESILIENCY IN SOFTROUTER ARCHITECTURE

(75) Inventor: Furquan Ahmed Ansari, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 641 days.

(21) Appl. No.: 11/313,056

(22) Filed: Dec. 20, 2005

(65) Prior Publication Data

US 2007/0140247 A1    Jun. 21, 2007

(51) Int. Cl.
*H04L 12/56* (2006.01)

(52) U.S. Cl. .................................... 370/392; 370/401

(58) Field of Classification Search ................ 370/328, 370/338, 349, 351, 352, 389, 392, 395, 401
See application file for complete search history.

(56) References Cited

U.S. PATENT DOCUMENTS

| 5,434,863 | A  | * | 7/1995  | Onishi et al. ............... 370/402 |
| 5,905,723 | A  | * | 5/1999  | Varghese et al. ............ 370/351 |
| 6,049,524 | A  | * | 4/2000  | Fukushima et al. .......... 370/220 |
| 6,577,634 | B1 | * | 6/2003  | Tsukakoshi et al. ..... 370/395.31 |
| 6,665,297 | B1 | * | 12/2003 | Hariguchi et al. ........... 370/392 |
| 6,687,247 | B1 | * | 2/2004  | Wilford et al. .............. 370/392 |
| 6,987,762 | B2 | * | 1/2006  | Shiota ........................ 370/389 |
| 7,126,944 | B2 | * | 10/2006 | Rangarajan et al. ......... 370/389 |
| 7,421,612 | B1 | * | 9/2008  | Maranhao et al. ............... 714/4 |
| 2003/0063613 | A1 | * | 4/2003 | Carpini et al. .............. 370/401 |
| 2004/0165601 | A1 | * | 8/2004 | Liu et al. .................... 370/401 |
| 2008/0068986 | A1 | * | 3/2008 | Maranhao et al. ........... 370/220 |

OTHER PUBLICATIONS

L. Yang et al., "RFC 3746—Forwarding and Control Element Separation (ForCES) Framework," Network Working Group, The Internet Society, Apr. 2004.
Pending U.S. Appl. 11/147,642, entitled "SoftRouter," filed Jun. 8, 2005.
Pending U.S. Appl. No. 11/147,472, entitled "SoftRouter Protocol Disaggregation," filed Jun. 8, 2005.
Pending U.S. Appl. No. 11/147,665, entitled "SoftRouter Protocol Failovers," filed Jun. 8, 2005.
Pending U.S. Appl. No. 11/147,937, entitled "SoftRouter Separate Control Network," filed Jun. 8, 2005.
Pending U.S. Appl. No. 11/147,768, entitled "SoftRouter Feature Server," filed Jun. 8, 2005.
Pending U.S. Appl. No. 11/147,491, entitled "SoftRouter Dynamic Binding Protocol," filed Jun. 8, 2005.
F. Baker ed., RFC1812, Requirements for IP version 4 Routers, Jun. 1995.
E. Rose et al., RFC 3031, Multiprotocol Label Switching Architecture (MPLS), Jan. 2001.

* cited by examiner

*Primary Examiner*—Hong Cho
(74) *Attorney, Agent, or Firm*—Wall & Tong, LLP

(57) ABSTRACT

Multiprotocol Label Switching (MPLS) Label Switched Path (LSP) tunnels provide protection and a switching mechanism between forwarding elements (FEs) and a control element (CE) for control and data traffic in a SoftRouter network.

20 Claims, 9 Drawing Sheets

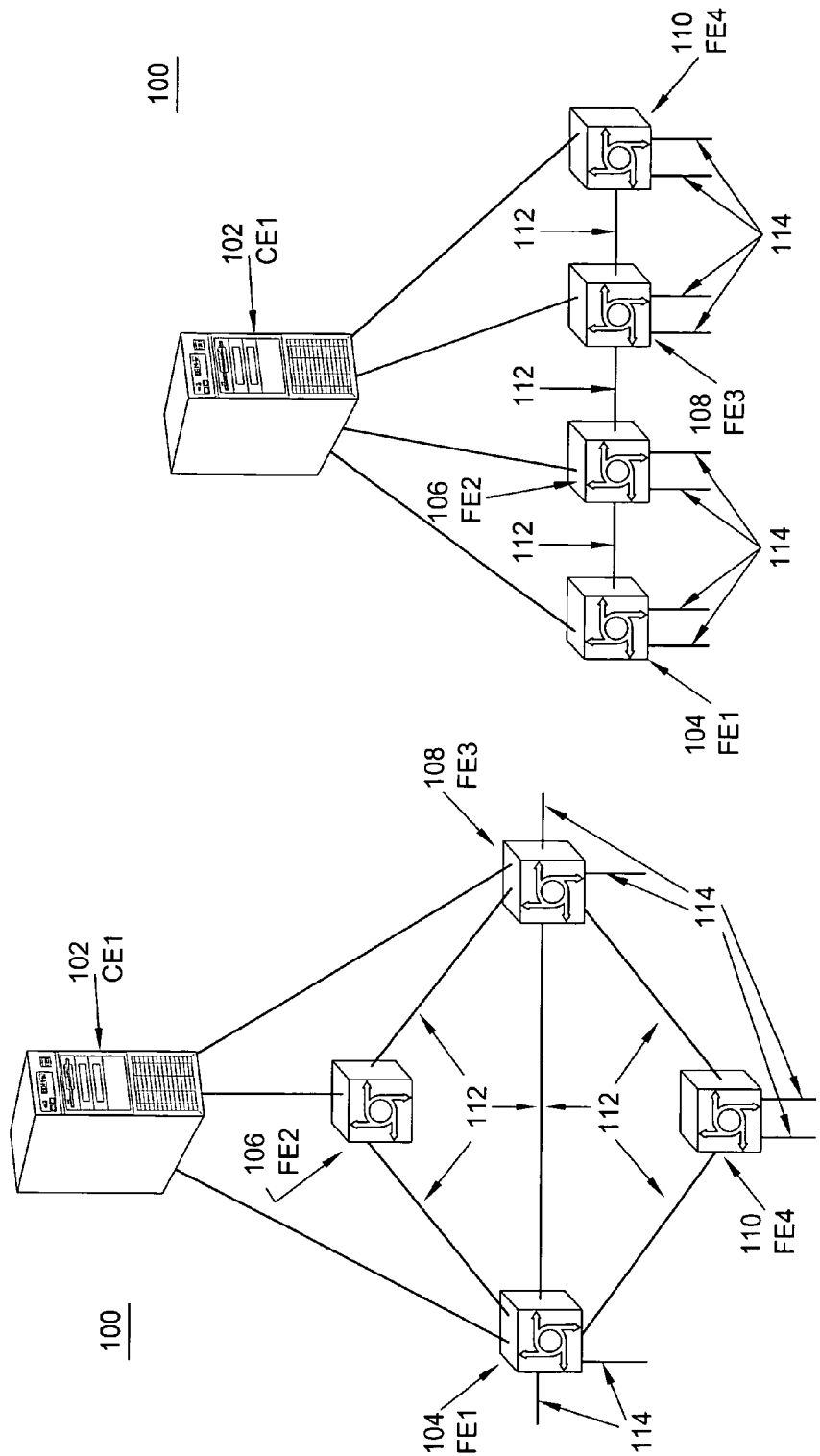

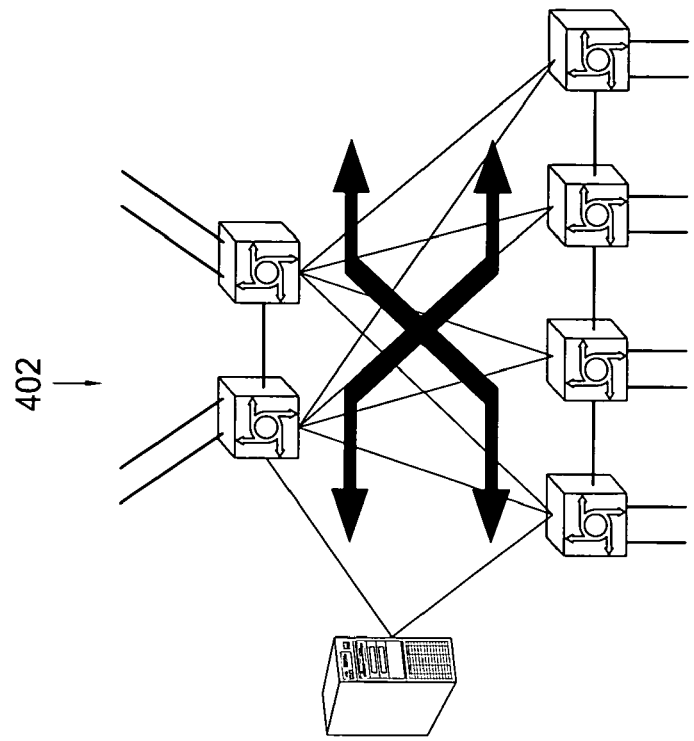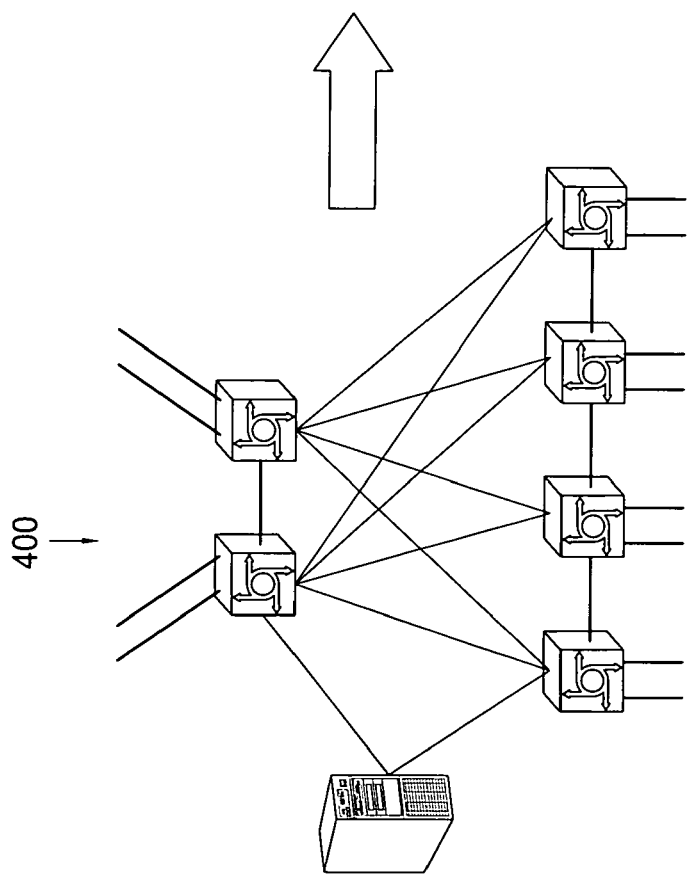
FIG. 4

INTER-FE MPLS LSP MESH NETWORK FOR SWITCHING AND RESILIENCY IN SOFTROUTER ARCHITECTURE

FIELD OF THE INVENTION

The present invention relates generally to networks and, in particular, relates to MPLS mesh and SoftRouter networks.

BACKGROUND OF THE INVENTION

Routing is usually directed by routing tables, which maintain a record of the best routes to various network locations in order to keep up with the packet arrival rate. Routing in computer networks is a method of finding paths from origins to destinations, along which information can be passed. Large networks involve complex topologies and may change constantly, making the constructing of routing tables very problematic. SoftRouter architecture provides a mechanism to address such complex topologies by minimizing the number of network elements in the network. However, inside the SoftRouter network itself, there is a need to route packets from the ingress forwarding element to the egress forwarding element. Packets traversing inside the SoftRouter need to behave as if they are traversing only a single data device. There is a need to achieve this by switching the packet from the ingress to the egress forwarding element, without performing hop-by-hop routing. There is also need for a mechanism to provide backup protection, without having to recompute routes or reconfigure routing tables when an internal link fails.

SUMMARY

Various deficiencies of the prior art are addressed by various exemplary embodiments of the present invention of an inter-FE Multiprotocol Label Switching (MPLS) mesh network for switching and resiliency in a SoftRouter architecture.

One embodiment is a method for routing. A data packet is encapsulated with a label associated with a tunnel upon arrival at an ingress forwarding element (FE). The tunnel connects the ingress FE to an egress FE. The data packet is routed to the egress FE and the label is removed from the data packet at the egress FE.

Another embodiment is a tunnel-mesh network topology that includes a number of FEs and a control element (CE). The FEs are connected in a topology, such that there is an inter-FE tunnel connecting any two FEs having at least one external link. The inter-FE tunnels are for data traffic. The CE has a tunnel for control traffic to each FE.

BRIEF DESCRIPTION OF THE DRAWINGS

The teachings of the present invention can be readily understood by considering the following detailed description in conjunction with the accompanying drawings, in which:

FIG. 1A is a block diagram showing an exemplary embodiment of a forwarding element (FE) physical-mesh topology;

FIG. 1B is a block diagram showing an exemplary embodiment of a FE linear topology;

FIG. 4 is a block diagram showing an exemplary embodiment of a multi-FE topology with a CE wherein the inter-FE tunnel connections can be viewed as a packet-switching fabric;

To facilitate understanding, identical reference numerals have been used, where possible, to designate identical elements that are common to the figures.

DETAILED DESCRIPTION OF THE INVENTION

Figure 2B:
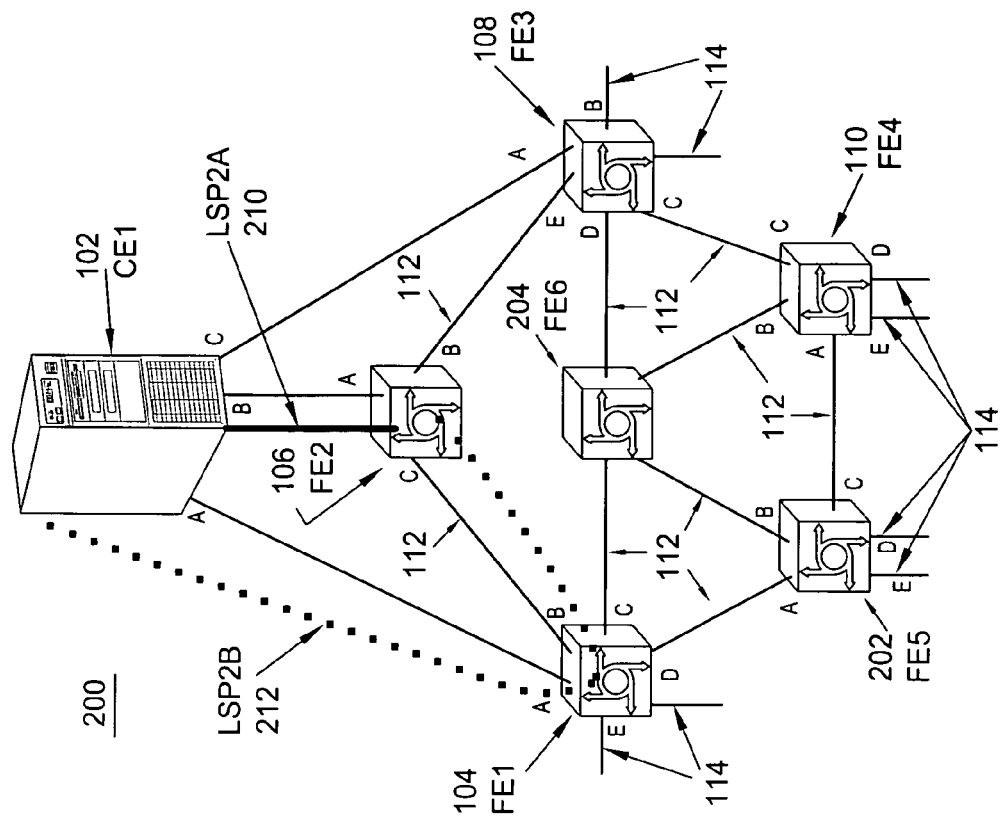
FIGS. 2A, 2B, 2C, 2D, 2E, and 2F are block diagrams showing an exemplary embodiment of a control element (CE)-to-FE control setup having Multiprotocol Label Switching (MPLS) tunnels between the FE and CE with backup paths.

The invention will be primarily described within the general context of embodiments of an inter-FE MPLS mesh network for switching and resiliency in a SoftRouter architecture. Those skilled in the art and informed by the teachings herein will realize that the invention is applicable generally to various methods for communicating control and data traffic over various network topologies, such as star, ring, linear, mesh, or other topologies.

The SoftRouter architecture, which is a realization of the Forwarding and Control Element Separation (ForCES) framework, establishes the concept of an Internet Protocol (IP) network element (NE) as one that appears to the external entities as a single, monolithic management entity performing all the necessary routing and forwarding tasks. However, internally, the NE is composed of several logically and, possibly, physically separate entities that cooperate to provide any given functionality. Each SoftRouter Network element typically includes two component elements: a control element (CE) and a forwarding element (FE). The CE typically handles the control plane operations for any given IP packet, such as routing and signaling protocols, and the FE typically handles the data path operations for any given IP packet. Each NE may have one or more control and forwarding elements (CEs and FEs).

FIG. 1A shows an exemplary embodiment of a FE physical-mesh topology 100 and FIG. 1B shows a FE linear topology 100. In FIGS. 1A and 1B, CE1 102 is connected to FE1 104, FE2 106, FE3 108, and FE4 110 with internal links 112 and external links 114. CEs and FEs are typically interconnected together in some form of topology 100 to behave as a single unit (NE). For example, all the FEs in a network may be connected in a star, ring, linear, mesh, or other topology. Each FE in the network may either be directly connected to at least one CE or may have a path through other FEs to the CE. For example, CE1 102 is directly connected to FE1 104, FE2 106, and FE3 108, but not directly connected to FE4 110. Multi-protocol Label Switching (MPLS) Label Switched Path (LSP) tunnels can be used to alleviate the problem of FEs, such as FE4 110, not being directly, physically connected to the CE. MPLS LSP tunnels can make such FEs appear to be one hop away from the perspective of the CE.

MPLS LSP Tunnels (Control LSP) for Control Traffic

In order for the CE to communicate and control each of the FEs, which are connected in some form of topology, the following propositions need to be satisfied.

1. The FE is reachable by the CE through a direct link/path.
2. If no direct path exists, the FE is reachable through an indirect path.
3. There is a discovery mechanism to determine the topology of the FEs.
4. There is a capabilities exchange mechanism to determine the capabilities of each FE.

Usually, the FEs and CEs can discover each other through some mechanism, either by using the dyna-bind protocol, by using the Rapid Spanning Tree Protocol (RSTP, IEEE 802.1w), or by using a modified version of the Dynamic Host Configuration Protocol (DHCP) relay mechanism. Usually, the FEs are capable of handling layer 2 bridging if RSTP is employed for discovery. The CE controls the FEs using the Internet Engineering Task Force (IETF)-based ForCES control protocol. However, in order to provide guaranteed service for the ForCES control protocol traffic, it is necessary to carry such traffic over a path that can provide quality of service (QoS) or class of service (CoS) differentiation from other packets. This feature is desirable, especially when the ForCES control traffic passes through multiple hops of FEs to reach the CE. If such QoS cannot be guaranteed, then other data traffic may overwhelm ForCES control traffic, potentially leading to the CE losing control of the FEs that it controls.

One aspect of the present invention is using MPLS LSPs between the CE and the FE. Bi-directional LSPs (or two uni-directional LSPs) with appropriate diffserv parameters are setup between the CE and the FE so that all ForCES control packets and ForCES data packets are carried over these LSPs. Such an LSP is called a control LSP. In order to provide resiliency to the control channel, backup LSPs are setup between the CE and any given FE. The backup LSP path chosen is normally completely disjoint from the primary LSP path. Usually, the CE and all the FEs are capable of handling MPLS LSPs. It is not necessary for the FEs to be able to handle MPLS protocols, such as Reservation Protocol (RSVP) or Label Distribution Protocol (LDP), but merely that the FEs are able to support the MPLS data path. The CE calculates the explicit route for the LSP between itself and the FE and provisions this path through configuration.

Figure 2A:
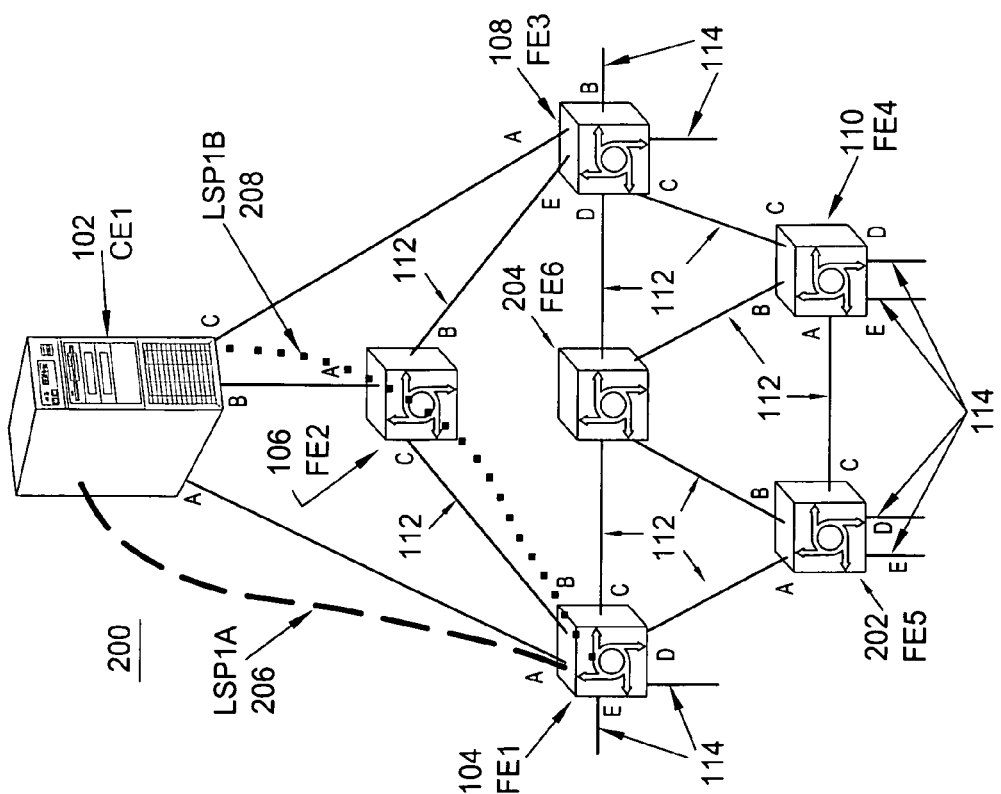
Figure 2D:
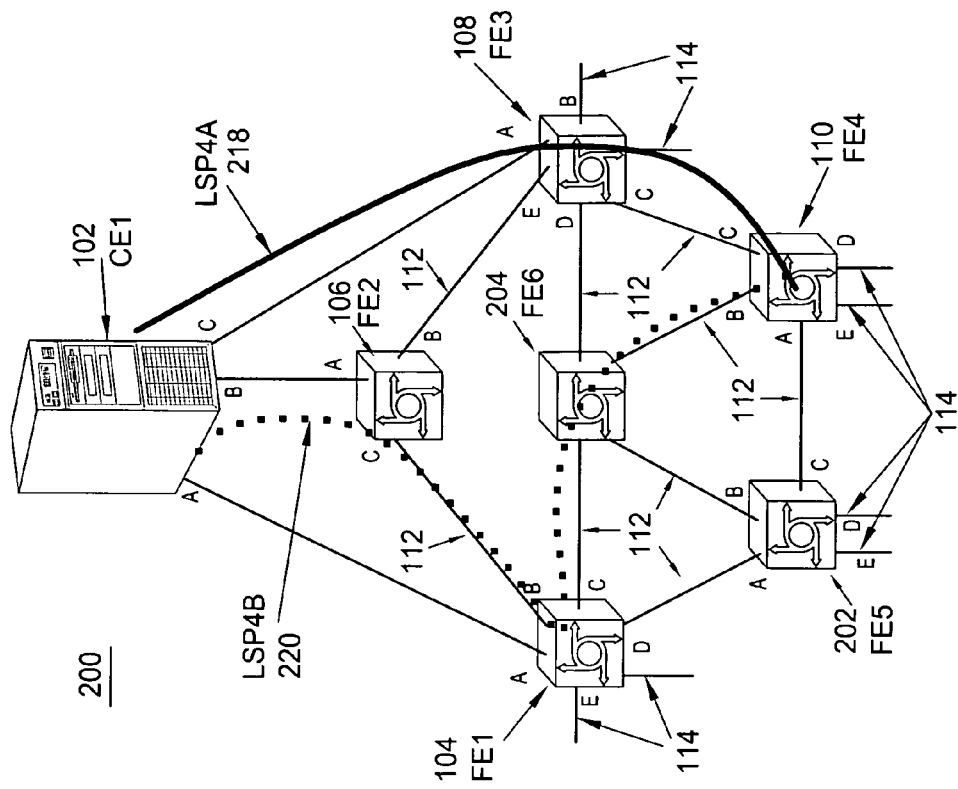
Figure 2C:
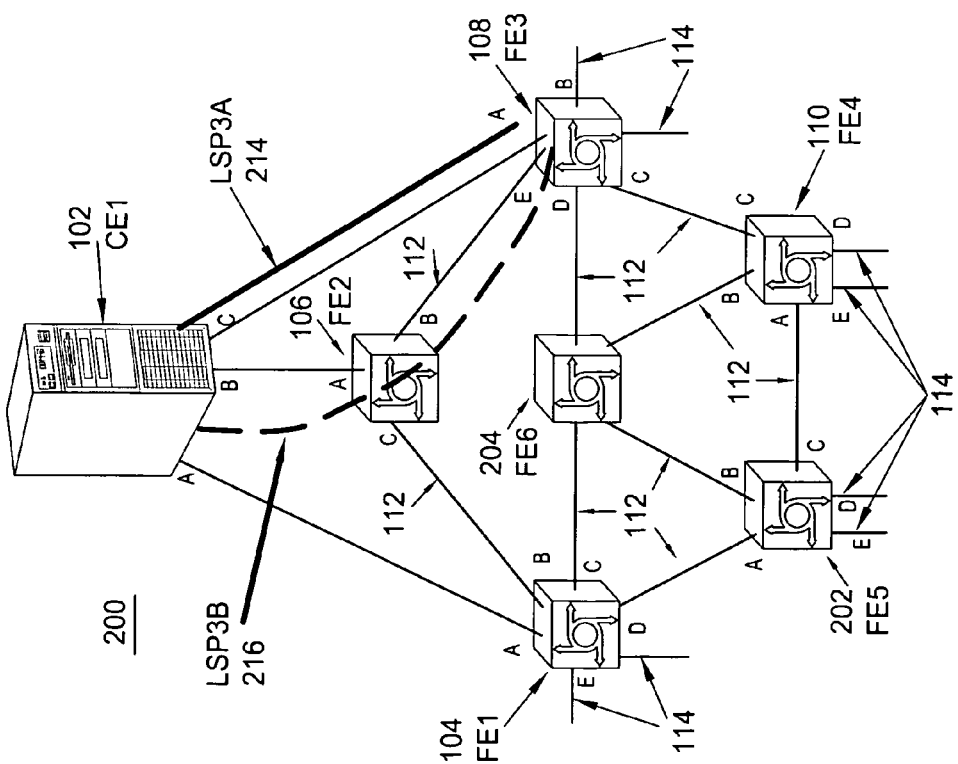
Figure 2F:
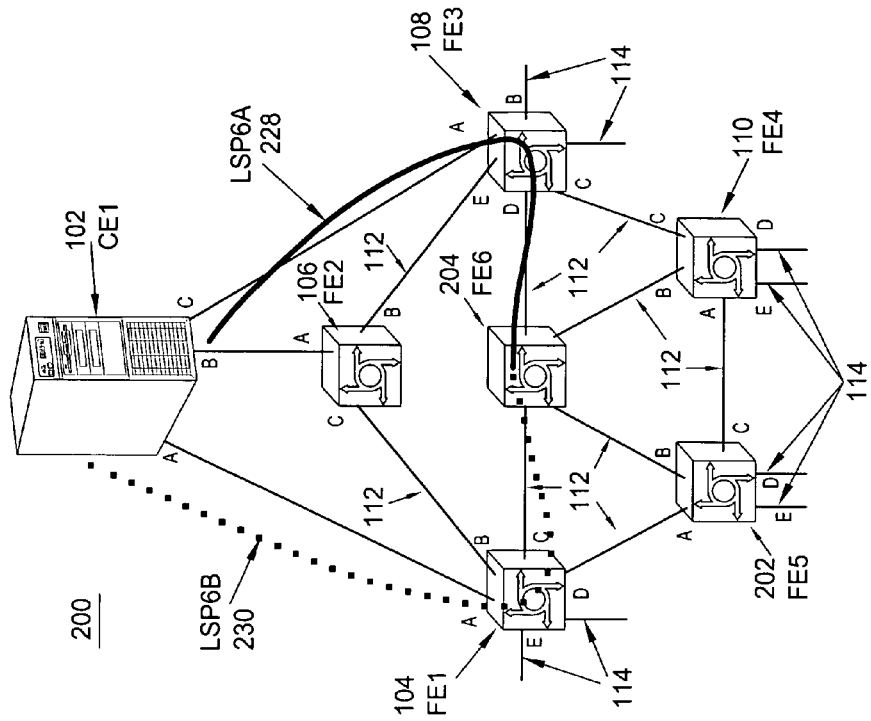
Figure 2E:
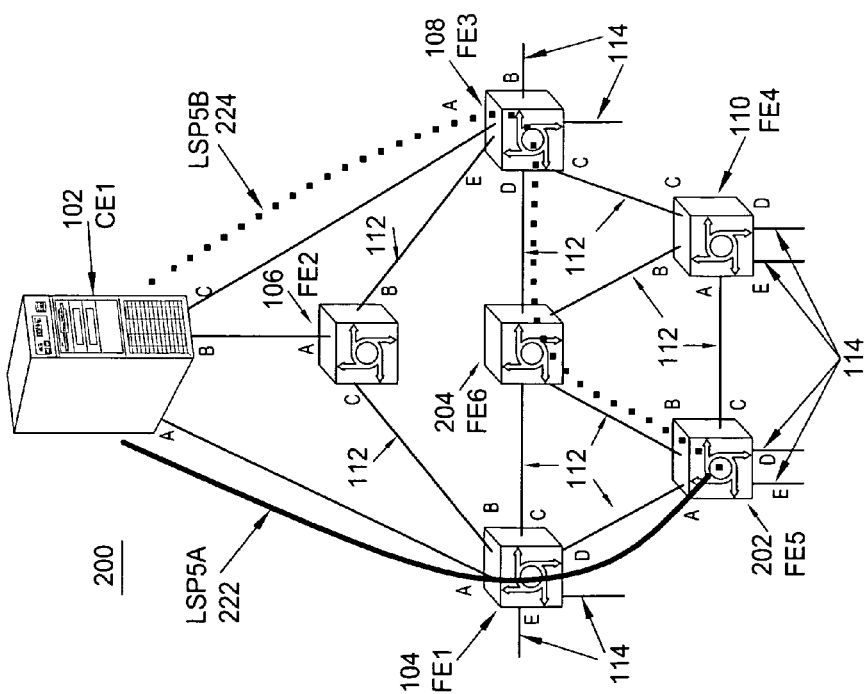

FIGS. 2A-2F show an exemplary embodiment of MPLS LSP path setups on an example SoftRouter 200. In FIGS. 2A-2F, there is a CE-to-FE control setup having MPLS tunnels between CE1 102 and each FE 104, 106, 108, 110, 202, 204 with backup paths. Each FE has links A, B, C, and some FEs also have links D and E. Each FE 104, 106, 108, 110, 202, 204 has a primary LSP and a backup LSP to the CE1 102 so that if the path or a node along the LSP path fails, it can still reach the CE1 102 by means of an alternative LSP path. FIG. 2A shows a primary LSP, LSP1A 206, and a backup LSP, LSP1B 208, between FE1 104 and CE1 102. FIG. 2B shows a primary LSP, LSP2A 210, and a backup LSP, LSP2B 212, between FE2 106 and CE1 102. FIG. 2C shows a primary LSP, LSP3A 214, and a backup LSP, LSP3B 216, between FE3 108 and CE1 102. FIG. 2D shows a primary LSP, LSP4A 218, and a backup LSP, LSP4B 220, between FE4 110 and CE1 102. FIG. 2E shows a primary LSP, LSP5A 222, and a backup LSP, LSP5B 224, between FE5 202 and CE1 102. FIG. 2F shows a primary LSP, LSP6A 228, and a backup LSP, LSP6B, between FE6 204 and CE1 102. In the very rare event of both the primary and the secondary LSP paths failing, the elements can resort to the default layer 3 routing or, if available, layer 2 switching.

Once the LSPs are established, all ForCES communication protocol messages are carried over these tunnels using an appropriate transport-mapping layer. For example, a ForCES protocol layer may employ TCP as the transport-mapping layer to carry the protocol messages reliably from the CE to the FE and vice-versa. These packets are tunneled over the LSPs by encapsulating the packets with appropriate MPLS labels. The use of LSPs for communication between the CE and FE allows differentiation of certain packets from non-ForCES packets, such as data packets that are simply switched through the elements from the ingress FE to the egress FE, without having to go to/through the CE. For example, in FIG. 2A, if a data packet arrives on interface E 114 of FE1 104 and the destination of the packets is to go through interface B 114 of FE3 108, it simply will be switched from FE1 104 to FE6 204 to FE3 108. Because these FEs also carry LSP tunnels for control traffic, higher priority or precedence is given to the control traffic over data traffic during contention, in one embodiment.

MPLS LSP Tunnels (Data LSP) for Data Traffic

In the SoftRouter architecture, there are a number of distributed forwarding elements that are connected together in some form of topology. When a data packet arrives from a neighboring router, there are two cases. In case one, the packet is meant for this router, because it is a control plane packet or the destination of the packets is this router itself. In such a case, the packet is forwarded to the control element over a control LSP using the ForCES protocol. In case two, the packet is meant for a different destination other than this router or the control element and has to be switched from the ingress FE to the egress FE before it can be sent out on a particular external link of the egress FE.

A mechanism for the second case is provided in one embodiment, where the data packet is switched from the ingress FE to the egress FE. Although, it is possible to simply reroute the data packets from the ingress FE to the egress FE, it simplifies matters greatly if a tunnel or an MPLS LSP was setup between the two a priori. This is because in order to route the packets internally, some form of routing protocol is required to setup routes specifically for the internal links. If static route protocol is employed for providing a routing path between the ingress and the egress, then any changes to the topology or the failure of the path would require the CE to detect the failure and install a new static route, during which period a number of data packets may be lost. Further, routing the packet at layer 3 has various other consequences, such as time-to-live (TTL) being decremented at each hop and the like. In order to prevent such a scenario and avoid making use of any internal routing protocol that would add additional burden to the FE central processing unit (CPU), an LSP tunnel mesh is setup from any FE with external links 114 to any other FE containing external links 114. It is not necessary to set up terminations at FEs that do not contain any external links 114, because FEs without any external links can neither be ingress nor egress nodes by definition. Data packets are switched through them to the appropriate next hops.

Figure 3A:
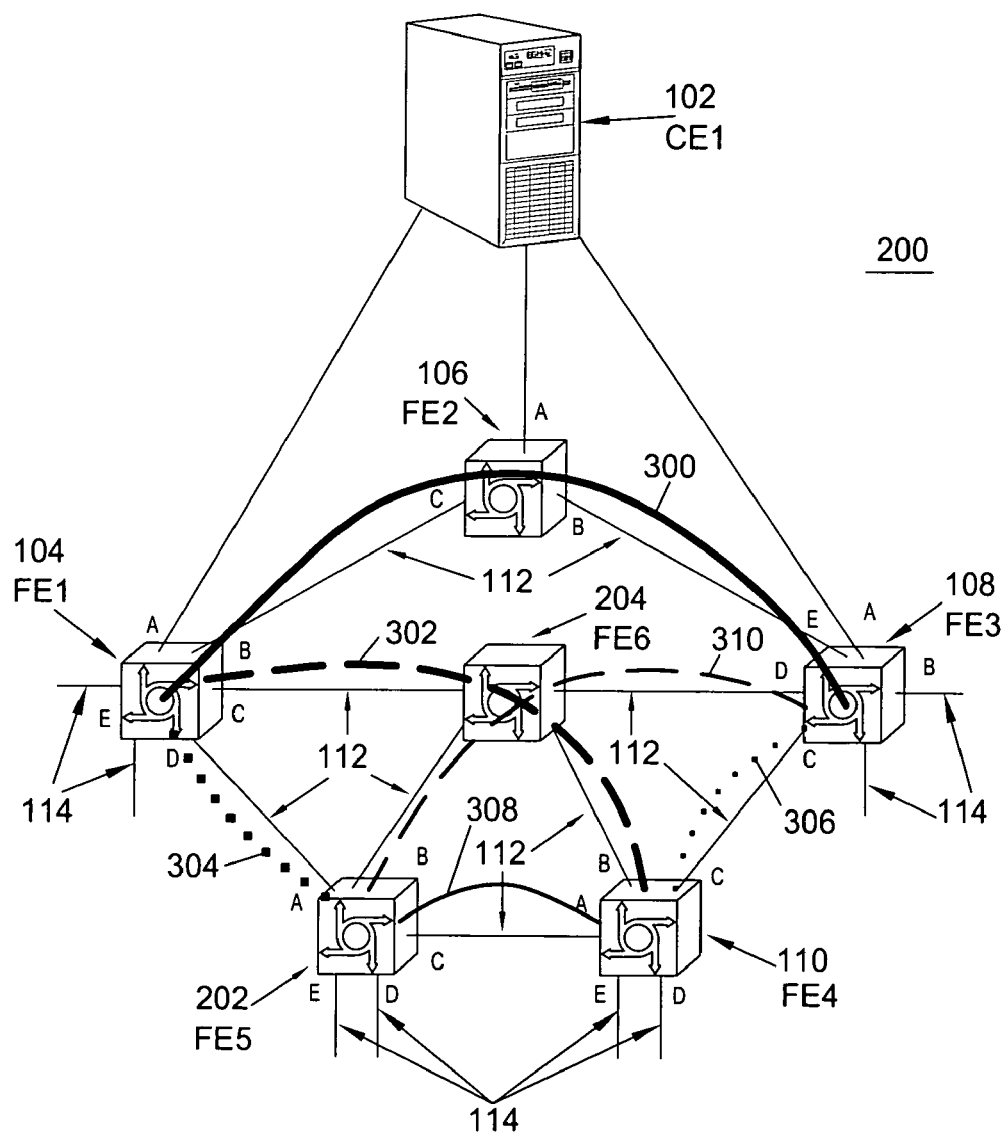
FIG. 3A is a block diagram showing an exemplary embodiment of a fast-path ingress to egress packet switching MPLS Label Switched Path (LSP) tunnel mesh with support for dynamic fast re-route setup.

FIG. 3A shows an exemplary embodiment of a fast-path ingress to egress packet switching MPLS LSP tunnel mesh 200 with support for dynamic fast re-route setup. FIG. 3A shows an example of the MPLS LSP tunnel mesh setup between all the ingress/egress FEs, i.e., FE1 104, FE3 108, FE4 110, and FE5 202. The MPLS LSP tunnel mesh includes LSP1-3A 300 between FE1 104 and FE3 108, LSP1-4A 302 between FE1 104 and FE4 110, LSP1-5A 304 between FE1 104 and FE5 202, LSP4-3A 306 between FE4 110 and FE3 108, LSP4-5A 308 between FE4 110 and FE5 202, and LSP5-3A 310 between FE5 202 and FE3 108.

Any IP data packet that arrives at an ingress FE is simply encapsulated with an MPLS label associated with the right LSP tunnel and switched over the egress LSP, where the label is removed (i.e., de-capsulated) and the IP packet is forwarded to the next-hop router. In one embodiment, there is a policy rule that indicates that the TTL is decremented only at either the ingress point or the egress point of the LSP, but not both. This ensures that multiple TTL decrements do not take place.

Figure 3B:
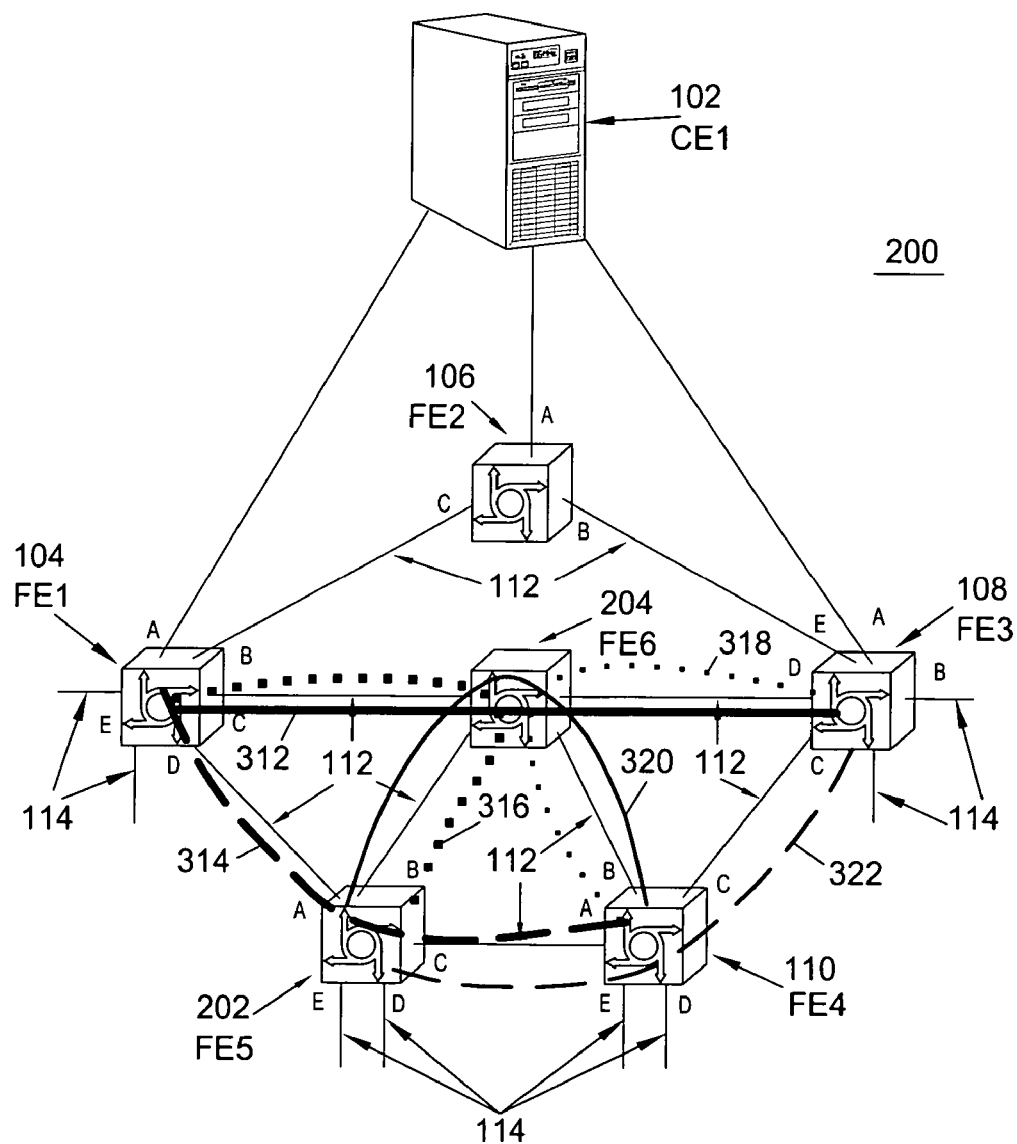
FIG. 3B is a block diagram showing an exemplary embodiment of a fast-path ingress to egress packet switching MPLS LSP tunnel mesh with backup paths that are pre-established.

FIG. 3B shows an exemplary embodiment of a fast-path ingress to egress packet switching MPLS LSP tunnel mesh 200 with backup paths that are pre-established. In FIG. 3B, backup paths include LSP1-3A 312 between FE1 104 and FE3 108, LSP1-4A between FE1 104 and FE4 110, LSP1-5A between FE1 104 and FE5 202, LSP4-3A 318 between FE4 110 and FE3 108, LSP4-5A 320 between FE4 110 and FE5 202, and LSP5-3A 322 between FE5 202 and FE3 108. In order to provide resiliency in one embodiment, backup data LSPs are optionally set up between the ingress and the egress FEs. In this embodiment, care is taken to make use of a completely disjoint path, if possible, when setting up the backup LSP. This ensures that if the primary LSP path fails, the data packets are switched over to the backup LSPs.

FIG. 4 shows an exemplary embodiment of a multi-FE topology with a CE 400 wherein the inter-FE tunnel connections can be viewed as a packet-switching fabric 402. The MPLS LSP tunnels setup between the ingress FEs and the egress FEs in the SoftRouter architecture act like the switching fabric of a traditional router architecture. A switching fabric is traditionally used to switch packets from the incoming ports to the outgoing ports. The same functionality is obtained by using the MPLS LSP tunnel mesh, as shown in FIG. 4.

Packet Flow through the FEs

Figure 5:
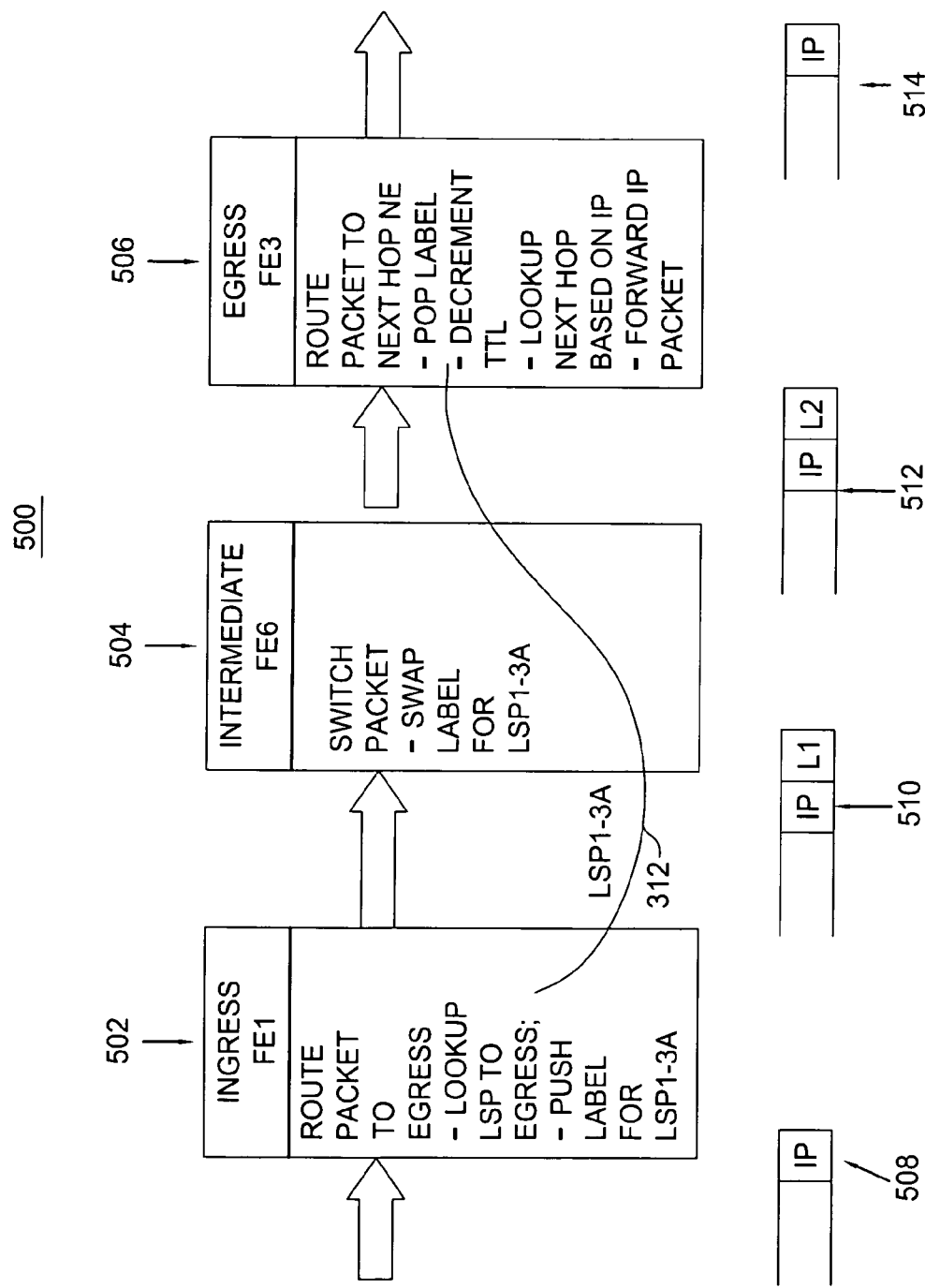
FIG. 5 is a flow chart showing an exemplary embodiment of packet flow in SoftRouter from an ingress FE to an egress FE over an MPLS LSP.

FIG. 5 is a flow chart showing an exemplary embodiment of a packet flow in SoftRouter from an ingress FE to an egress FE over an MPLS LSP, i.e., FE1 104 to FE3 108 over LSP1-3A 312 (See FIG. 3B). At 502, ingress FE1 104 routes a packet to egress FE3 108 by looking up the LSP to the egress FE3 108 and pushing the label for LSP1-3A 312. At 504, the intermediate FE6 204 switches the packet by swapping the label for LSP1-3A. At 506, the egress FE3 108 routes the packet to the next hop NE by popping the label, decrementing TTL, looking up the next hop based on IP, and forwarding the IP packet.

FIG. 5 shows an exemplary embodiment of a packet flow mechanism through the SoftRouter tunnels setup, i.e., through the FE nodes within the SoftRouter over the MPLS LSP tunnels. When a packet arrives at the ingress FE (FE1 104) over the external link, the packet needs to be switched to the appropriate destination FE (FE3 108) within the SoftRouter. In this example, the destination of the packet is not this network element itself. The packet is of type IP in this example, but could be any type, such as MPLS, Asynchronous Transfer Mode (ATM), Ethernet, and the like. On performing a longest prefix match lookup at the ingress FE (FE1 104) to determine the next hop router (i.e., next network element or host), the ingress FE (FE1 104) determines that the next hop is connected to the egress FE3. asdf As a result, the ingress FE (FE1 104) now has to send the packet from FE1 104 to FE3 108 without affecting any contents of the packet, e.g., the TTL field in the packet should not be decremented multiple times as it is traversing within the same network element. The RFC1812 standard requires that the TTL field in the IP header only be decremented once for a given network element. This is achieved in one embodiment by encapsulating the packet within the MPS LSP tunnel and switching it using MPLS labels as shown in FIG. 5. In FIG. 5, the packet initially has an IP header at 508, then label L1 is added at 510, changed to label L2 at 512, and, finally, at 514 the packet has same IP header as at 508. The encapsulated packet is de-encapsulated at the egress FE at 506 and the TTL field is decremented and another lookup is performed to determine which port on the egress FE at 506 to send out the packet. Once this is determined, the IP packet is shipped out to the appropriate next hop.

The present invention has many advantages. In various embodiments, MPLS LPS tunnels are set up between FEs and the CE as opposed to setting up a routing state or doing source routing in traditional networks. Control information can be sent from the CE to control an FE. In some embodiments, a backup tunnel can be used in case the primary tunnel is not available.

Figure 6:
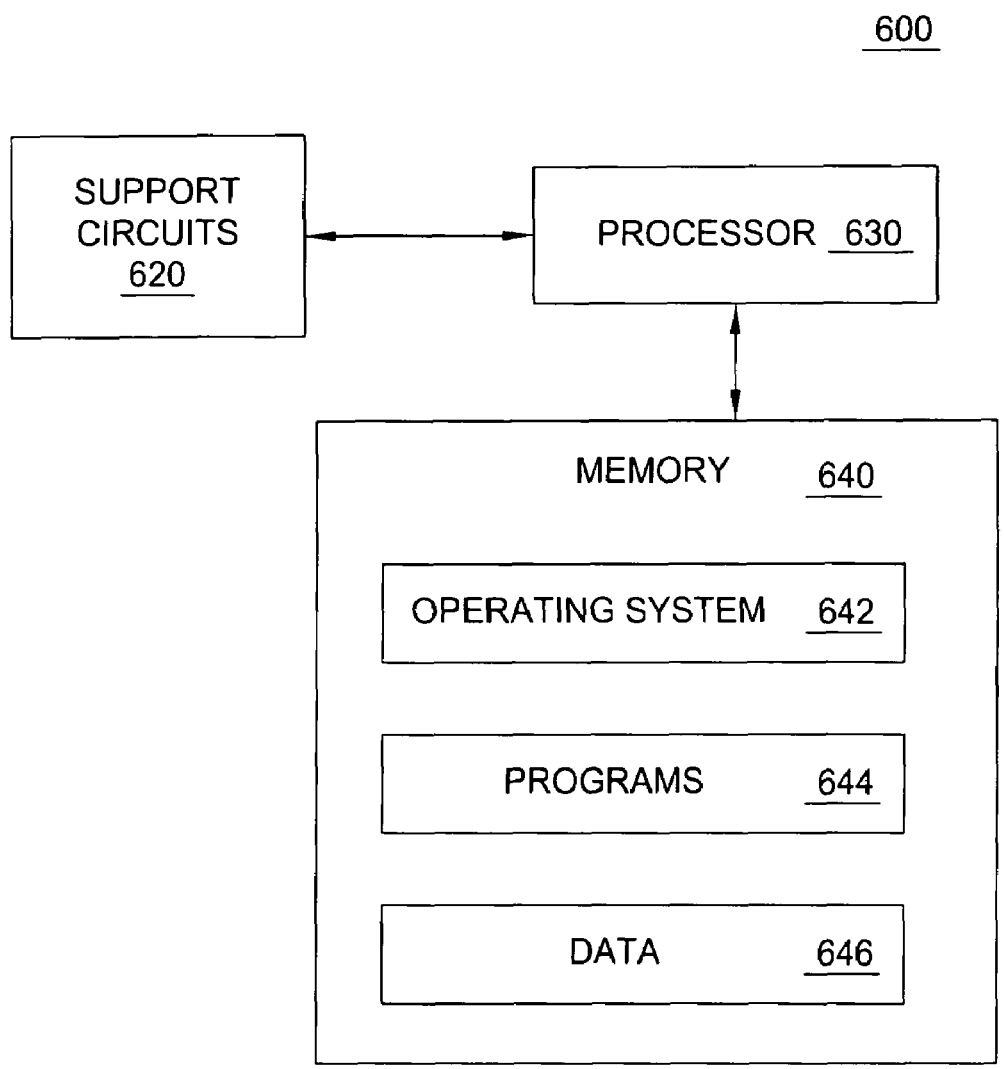
FIG. 6 is a high level block diagram showing a computer.

FIG. 6 is a high level block diagram showing a computer. The computer 600 may be employed to implement embodiments of the present invention. The computer 600 comprises a processor 630 as well as memory 640 for storing various programs 644 and data 646. The memory 640 may also store an operating system 642 supporting the programs 644.

The processor 630 cooperates with conventional support circuitry such as power supplies, clock circuits, cache memory and the like as well as circuits that assist in executing the software routines stored in the memory 640. As such, it is contemplated that some of the steps discussed herein as software methods may be implemented within hardware, for example, as circuitry that cooperates with the processor 630 to perform various method steps. The computer 600 also contains input/output (I/O) circuitry that forms an interface between the various functional elements communicating with the computer 600.

Although the computer 600 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or equivalent, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for routing, comprising:
    encapsulating, upon arrival at an ingress forwarding element (FE), a data packet with a label associated with a pre-established tunnel, the pre-established tunnel connecting the ingress FE to an egress FE wherein an FE without any external link would neither be ingress nor egress node;
    routing the data packet to the egress FE wherein upon failure of both the primary and secondary Label Switched Path (LSP), the elements may resort to the default layer 3 routing or layer 2 switching; and removing the label from the data packet at the egress FE.

2. The method of claim 1, further comprising:

switching the label at an intermediate FE.

3. The method of claim 1, further comprising:

decrementing a time-to-live (TTL) in a header of the data packet at the egress FE.

4. The method of claim 1, further comprising:

decrementing a time-to-live (TTL) in a header of the data packet at the ingress FE.

5. The method of claim 1, further comprising:

performing a lookup to determine a port on the egress FE to send out the data packet.

6. The method of claim 1, wherein the ingress FE and egress FE are part of a plurality of FEs in a topology, further wherein inter-FE tunnels connects any two FEs that each have at least one external link.

7. The method of claim 6, wherein a control element (CE) has a tunnel for control traffic to each FE.

8. A tunnel-mesh network topology, comprising:

a plurality of forwarding elements (FEs) connected in a topology, an inter-FE pre-established tunnel connecting any two FEs that each have at least one external link, each inter-FE pre-established tunnel being for data traffic wherein an FE without any external link can neither be ingress nor egress node;

a control element (CE) having a tunnel for control traffic to each FE wherein upon failure of both the primary and secondary Label Switched Path (LSP), the elements may resort to the default layer 3 routing or layer 2 switching.

9. The tunnel-mesh network topology of claim 8, wherein the interconnection of inter-FE tunnels in a full mesh simulates a behavior of a packet switching fabric of a router.

10. The tunnel-mesh network topology of claim 8, wherein additional FEs and inter-FE tunnels are added to increase router capacity.

11. The tunnel-mesh network topology of claim 8, wherein the tunnel is a primary tunnel and further comprising a backup tunnel between the CE and each FE.

12. The tunnel-mesh network topology of claim 8, wherein the inter-FE tunnel is a primary inter-FE tunnel and further comprising a backup inter-FE tunnel between any two FEs that each have at least one external link.

13. The tunnel-mesh network topology of claim 8, further comprising:

a discovery mechanism for determining the topology of the FEs.

14. The tunnel-mesh network topology of claim 8, further comprising at least one additional CE.

15. A computer readable medium storing instructions for performing a method for routing, the method comprising:

encapsulating, upon arrival at an ingress forwarding element (FE), a data packet with a label associated with a pre-established tunnel, the pre-established tunnel connecting the ingress FE to an egress FE wherein an FE without any external link can neither be ingress nor egress node;

routing the data packet to the egress FE wherein upon failure of both the primary and secondary Label Switched Path (LSP), the elements may resort to the default layer 3 routing or layer 2 switching; and removing the label from the data packet at the egress FE.

16. The computer readable medium of claim 15, further comprising:

switching the label at an intermediate FE.

17. The computer readable medium of claim 15, further comprising:

decrementing a time-to-live (TTL) in a header of the data packet at the egress FE.

18. The computer readable medium of claim 15, further comprising:

performing a lookup to determine a port on the egress FE to send out the data packet.

19. The computer readable medium of claim 15, wherein the ingress FE and egress FE are part of a plurality of FEs in a topology, further wherein inter-FE tunnels connects any two FEs that each have at least one external link.

20. The computer readable medium of claim 19, wherein a control element (CE) has a primary and a backup tunnel for control traffic to each FE.

* * * * *